United States Patent [19]

Helms

[11] Patent Number: 4,946,293
[45] Date of Patent: Aug. 7, 1990

[54] GAS BEARING HAVING AN AUXILIARY RESERVOIR

[75] Inventor: Israel F. Helms, Coventry, R.I.

[73] Assignee: Brown & Sharpe Manufacturing Company, North Kingstown, R.I.

[21] Appl. No.: 309,428

[22] Filed: Feb. 10, 1989

[51] Int. Cl.⁵ .............................................. F16C 32/06
[52] U.S. Cl. .......................................... 384/12; 384/9; 384/100
[58] Field of Search .................... 384/12, 99, 100, 111, 384/113, 114, 117, 118, 120–122

[56] References Cited

U.S. PATENT DOCUMENTS

| | | | |
|---|---|---|---|
| 3,101,980 | 8/1963 | Love | 384/114 |
| 3,602,557 | 8/1971 | Girot | 384/120 |
| 4,413,864 | 11/1983 | Phillips | 384/12 |
| 4,643,590 | 2/1987 | Olasz | 384/12 X |
| 4,690,572 | 9/1987 | Sasaki | 384/100 X |
| 4,697,933 | 10/1987 | Morita | 384/12 |
| 4,767,223 | 8/1988 | Goodwin | 384/100 X |

Primary Examiner—Thomas R. Hannon
Attorney, Agent, or Firm—Wolf, Greenfield & Sacks

[57] ABSTRACT

A gas bearing system for maintaining high static stiffness while damping high and low frequency vibrations. The system includes a bearing shoe having a primary reservoir which is supplied with gas through a primary restrictor, and an auxiliary reservoir. A secondary restrictor couples the primary reservoir to the auxiliary reservoir. Gas passes through ports from the primary reservoir into the gap between the bearing surface of the bearing shoe and a bearing surface of a rail. The secondary restrictor has a resistance to flow of gas therethrough greater than the resistance to flow of gas through the ports but less than the resistance to flow of gas through the primary restrictor. This arrangement provides damping over a larger frequency range than is known in the prior art. Such a system is particularly suitable for use in a gantry-type coordinate measuring machine.

15 Claims, 2 Drawing Sheets

4,946,293

GAS BEARING HAVING AN AUXILIARY RESERVOIR

FIELD OF THE INVENTION

This invention relates generally to fluid bearings for precision movement of machine parts with respect to one another, and more particularly, to gas bearings with high static stiffness having means for dampening of both high and low frequency vibrations.

BACKGROUND OF THE INVENTION

In precision machines, such as machine tools, coordinate measuring machines, and other like machines, gas bearings are frequently used to permit relatively frictionless movement of portions of the machine, including a carriage, along machine rails. Such gas bearings may be caused to vibrate by vibrations in the machine structure and these gas bearings, particularly ones with high static stiffness respond to machine vibrations much like a spring Such vibrations are undesirable, and can affect machine accuracy if not quickly damped out of the system. Of most concern, is when the frequency range over which the gas bearings are unstable coincides with the natural or resonant frequency of the machine parts. In such circumstances the bearing may act as an amplifier, sustaining or even amplifying the machine vibrations. Thus, it becomes even more difficult to damp the vibrations out of the system, thus destroying its alignment and accuracy.

Such vibrations are of particular concern in high precision positioning machines, such as high precision tooling machines or coordinate measuring machines. Gantry-type support structures are commonly used in such coordinate measuring machines. Such a gantry-type structure typically includes a base, a table resting on the base, a gantry structure which rides on parallel, spaced rails supported by the base and a carriage which rides on the gantry structure. A vertically movable element, typically referred to as a Z-rail, includes a touch sensitive probe disposed on the lower end thereof, and the Z-rail moves vertically with respect to the carriage, while the carriage moves horizontally along a rail disposed on the gantry structure. Gas bearings are used to facilitate the movement of the gantry structure on its associated rails. The probe disposed on the end of the Z-rail therefore can be moved in three dimensions to be positioned at any point on the table for measuring a position on a part to be tested.

In use, the gantry-type structure is rapidly accelerated and decelerated to deliver the probe to the point at which it is to perform its work or measurement. Such rapid movements are necessary so that measurements can be taken rapidly and so that the period for testing a part is not intolerably long. In part because such gantry-type structures generally are driven only at one end, vibrations can result in the structure because of the structure's inherent inertia, as described below. A torque is produced about the point at which the drive is coupled to the gantry-type structure, and it may be assumed for most purposes that the torque is applied at the center of gravity of the gantry-type structure and has a moment arm which extends from the point of coupling of the drive to the structure to the center of gravity thereof. Since the gantry-type structure has a certain elasticity, and since continued movement of the structure is resisted by the drive, and by the bearings which maintain the proper positioning of the structure, this torque causes vibrations to be set up in the gantry about the point at which the gantry is coupled to the drive. These vibrations are then transferred to the air bearings, which as described, act like an active string. Obviously, it is desirable to damp the vibrations out of the system as quickly as possible to avoid measurement errors.

For high precision coordinate measuring machines, it is essential that the measurements be taken when no vibrations are present, so that the precise alignment can be maintained. Therefore most prior art coordinate measuring machines have bearings which provide high static stiffness and a somewhat lower dynamic stiffness. This high static stiffness is achieved by making the air gap suite narrow and the gas supply low. As the bearing moves from a static condition to a dynamic one in which it is moving with respect to its associated rail, the stiffness of the bearing decreases with respect to the vibrational frequency of the structure until a generally constant, steady state stiffness is reached. Should the natural or resonant frequency of the machine structure coincide with this area of declining stiffness, the system could become unstable, and the vibrations would be very difficult to damp out of the system.

In an effort to reduce the frequencies over which the stiffness versus frequency curve has a negative slope, some prior art bearing shoes are provided with a small internal reservoir communicating with the gas ports which lead to the bearing surface of the shoe and which provide the desired gas cushion. This internal reservoir damps certain high frequency vibrations, and at these frequencies, this chamber acts like an unlimited air supply, so that the bearing appears less stiff to damp the vibrations more quickly. However, this prior art internal reservoir is not sufficient to damp vibrations at certain lower frequencies. In certain gantry-type coordinate measuring machines, because of their large moments of inertia, the system has resonant frequencies which are lower than those that can be damped by such prior art bearings. These resonant frequencies coincide with the negative part of the slope of the stiffness versus frequency curve and the system can become unstable under those conditions.

Therefore, it is an object of the present invention to provide a gas bearing with improved stiffness.

It is another obJect of the present invention to provide an improved gas bearing for use in high precision coordinate measuring machines having a gantry-type structure.

It is yet another object of the present invention to provide a gas bearing which provides adequate damping over a broader range of frequencies.

It is yet another further obJect of the present invention to provide a gas bearing with high static stiffness which dampens vibrations at all frequencies which coincide with the resonant frequencies of a gantry-type coordinate measuring machine.

It is still another further object or the present invention to shift the portion of the bearing stiffness versus frequency curve having a negative slope into an area where there are no resonant frequencies for a gantry-type coordinate measuring machine.

SUMMARY OF THE INVENTION

This invention relates generally to an improved gas bearing system, and more particularly to a gas bearing system which permits the damping of both high and lower frequency vibrations so that vibrations corresponding to the resonant frequencies of the machine with which the bearing is used are damped to prevent such vibrations from becoming unstable and affecting the accuracy of the machine or possibly even destroying the precision alignment of the machine. Such gas bearing systems have particular application to coordinate measuring machines, especially those with a gantry-type structure, as well as another high precision positioning machines where the alignment is critical to the proper operation of the machine.

The gas bearing system of this invention includes a bearing shoe having a bearing surface in spaced confronting relation with a bearing surface of the rail of which the shoe rides. The bearing shoe includes a primary reservoir which is supplied by pressurized gas through a primary restrictor from a source of gas. A second, larger auxiliary reservoir is coupled to the primary reservoir through a secondary restrictor. The auxiliary reservoir is a closed reservoir which only receives air from the main reservoir through the secondary restrictor. The air in the primary reservoir is distributed to ports which supply gas to the bearing surface of the shoe to provide an air cushion between the shoe bearing surface and the rail surface. The resistance to flow of gas through the primary restrictor from the gas source is greater than the combined resistance to flow of gas through the ports at the bearing surface. The secondary restrictor which controls flow of aid between the auxiliary reservoir and the primary reservoir has a higher resistance to flow of gas than the combined resistance to flow through the ports leading to the bearing surface, but a lower resistance to flow than the primary, upstream restrictor. The auxiliary reservoir may be tuned in its volume and secondary restrictor resistance to meet the specific requirements of the particular machine structure elements most vulnerable to oscillation. The smaller, primary reservoir provides the requisite dampening at high frequencies and allows the maintenance of high static stiffness. At lower frequencies, the auxiliary reservoir in combination with the primary reservoir provides dampening of vibrations.

In this manner, the same apparatus provides dampening of both high and low frequency vibrations including damping at the resonant frequencies of the coordinate measuring machine, while maintaining a high static stiffness in the bearing. Thus, the portion of the bearing stiffness versus frequency curve having a negative slope is shifted outside the range of resonant frequencies for the machine and unstable conditions are avoided.

BRIEF DESCRIPTION OF THE DRAWINGS

The objects, advantages and features of this invention will be more clearly appreciated from the following detailed description when taken in conjunction with the accompanying drawings in which.

DETAILED DESCRIPTION OF THE PREFERRED EMBODIMENTS

Gas bearings are used in most precision machines which require precise positioning of a tool or probe, such as machine tools, coordinate measuring machines and the like. Such gas bearings permit relatively frictionless movement in three dimensions along machine rails of different portions of the machine with respect to one another to permit precise positioning of a probe or tool. Although the present invention will be described with particular reference to a coordinate measuring machine having a gantry-type structure, it is to be understood that the use of this invention in such a coordinate measuring machine is exemplary only, and that this invention can be used in other high precision positioning machines, such as machine tools, which require the use of gas bearings for frictionless movement, and which require damping of both high and lower frequency vibrations in the system.

Figure 1:
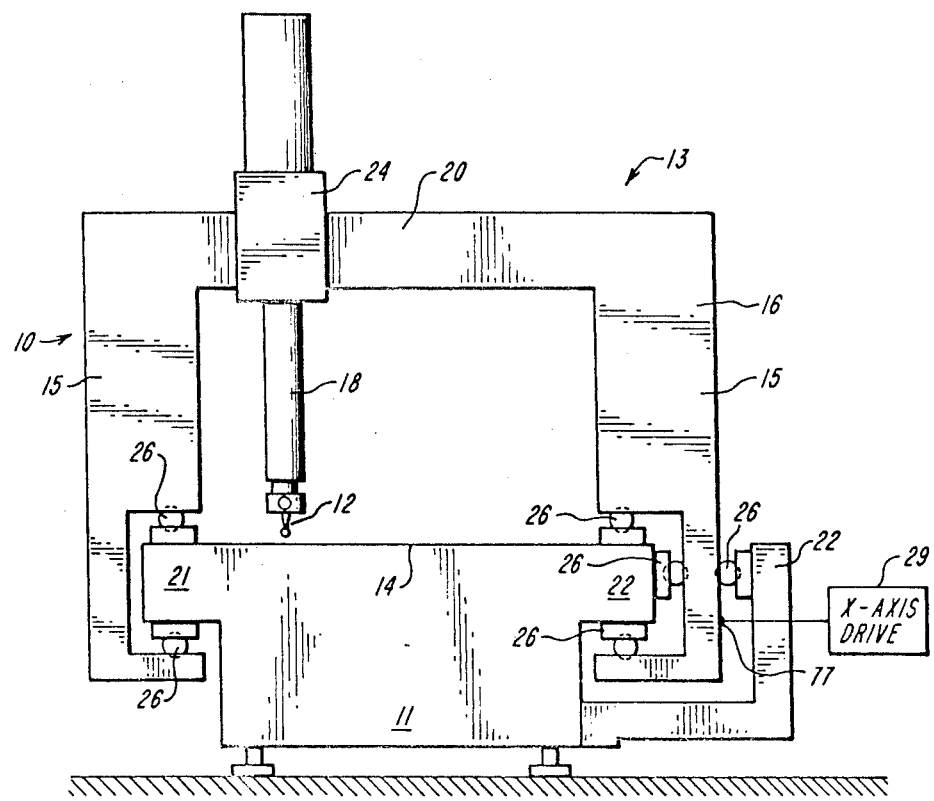
FIG. 1 is a front, pictorial view showing a coordinate measuring machine utilizing the gas bearing system of the present invention.

An exemplary application of the gas bearing system of this invention in a gantry-type coordinate measuring machine will now be described with particular reference to FIG. 1. FIG. 1 schematically illustrates such a coordinate measuring machine 10 which is used for dimensional inspection of a workpiece, such as a machine part. Machine 10 includes a base assembly 11, a bridge 13 and a carriage 24. Carriage 24 is movable horizontally, or in a Y-direction, on quideways along Y-rail 20. Y-rail 20 is carried by vertical support members 15, which together with Y-rail 20, form bridge 13. Support members 15 ride on X-rails 21 and 22 and permit bridge 13 to be movable in the X direction. X-rails 21 and 22 are mounted on base assembly 11. A Z-rail 18 is mounted on and is movable in a vertical or Z-direction with respect to carriage 24. Z-rail 18 is carried by carriage 24 and itself carries a probe 12 on its lower, distal end. Probe 12 may be brought into contact with points on the surface of a workpiece for determination of the coordinates of those points.

Gas bearings 26 are utilized to allow relatively frictionless movement of support members 15 of X-rails 21 and 22. Also, similar gas bearings (not shown) permit relatively frictionless movement of Z-rail 18 with respect to carriage 24, and movement of carriage 24 on Y-rail 20. Typically, as shown, bearings 26 are disposed on opposite sides of rails 21 and 22. Such bearings typically, but not necessarily, are disposed in directly opposed, confronting relation with respect to one another. Bridge 13 is driven by X-axis drive 29, which is typically coupled with bridge 13 only at point 77 on X-rail 22. A Y-rail drive (not shown) moves carriage 24 along Y-rail 20, and a Z-rail drive (not shown) contained within carriage 24 moves Z-rail 18 upwardly and downwardly with respect to carriage 24.

Typically, measurements are made of a part under test by bringing probe 12 into contact with a reference point on the part. The coordinates of the reference point along the X, Y and Z-rails, as measured by the probe, are then electronically sensed and translated into digital information. The probe is then moved to a second point on the part under test, and the position of the second point with respect to the X, Y and n-rails is again digitally recorded. Additional reference points on the part under test may be measured an a similar fashion, and the coordinate information is then assimilated by a computer (not shown) within the coordinate measuring machine, and a determination is made if the part under test meets the required specifications.

During movement of bridge 13 with respect to base assembly 11, vibrations in the bridge structure are created. The vibrational problem is exacerbated because bridge 13 is driven only at X-rail 22, and not at X-rail 21 Because the bridge 13 often has a large moment of inertia, a torque is applied to bridge 13 about the point at which the X-axis drive 29 is coupled to bridge 13 as bridge 13 is rapidly accelerated and decelerated. The force applied to bridge 13 is determined from the acquired momentum of the bridge during deceleration and from the weight of the bridge during acceleration and the moment arm is the distance from point 77 to the center of mass of the bridge. Because of the inherent flexibility of the bridge structure and because movement of the bridge is restrained by X-axis drive 29 at point 27 and by bearings 26, vibrations are induced in the bridge and these vibrations in the bridge structure are transferred to bearings 26. The amplitude and frequency of these vibrations age determined by the particular structure of the bridge.

In coordinate measuring machines, air bearings with a high static stiffness are required so that the desired precise alignment is maintained during steady state periods when measurements are being taken. However, such stiff air bearings have very small air gaps between the bearing surface of a bearing shoe and the confronting bearing surface of the rail on which the bearing rides. Also, a low air supply is used to produce this air gap in bearings with high static stiffness. These stiff bearings act like an active spring and react sharply to any change in the size of the air gap. Once the bearings receive vibrations from the bridge 13, they begin to vibrate as well, oscillating with their opposed counterpart about their associated rail. As the air gap on one bearing increases, its opposed counterpart has a correspondingly smaller air gap and vice versa. The bearing system will continue to vibrate until the vibrations have been damped out of the system. Typically, the stiffer the bearings are, the longer it takes to damp vibrations out of the system. This time is often referred to as the settling time for the system.

Figure 2:
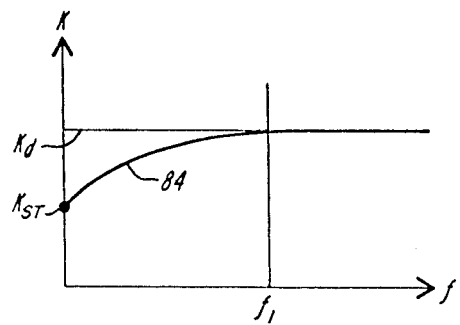
FIG. 2 is a graph showing a plot of bearing stiffness versus frequency for a typical prior art gas bearing having a low static stiffness.
Figure 3:
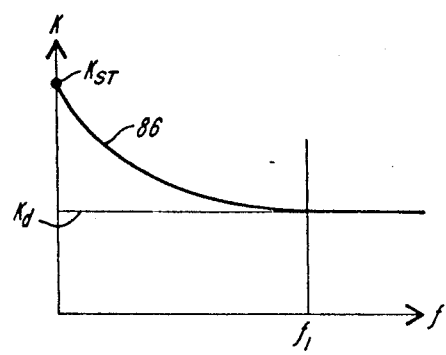
FIG. 3 is a graph showing a plot of bearing stiffness versus frequency for a typical prior art gas bearing having a high static stiffness.

FIGS. 2 and 3 are each graphs showing a plot of the stiffness of a gas bearing versus the frequency of the vibrations of the bridge structure. The bearing stiffness is expressed as force over displacement and can have the units of pounds per inch, or newtons per meter. The vibrational frequency of the bridge structure is expressed as Hertz. FIG. 2 has a curve 84 illustrating the situation in which the static stiffness of the bearing, $K_{ST}$ is low with respect to the stiffness of the bearing under dynamic conditions. FIG. 3, has a curve 86 illustrating the situation in which the static stiffness $K_{ST}$ of the bearing is high with respect to the stiffness of the bearing under dynamic conditions. Such a bearing with high static stiffness is preferred for coordinate measuring machines, because it provides high accuracy under static conditions. In both cases, the stiffness of the bearing tends to become nearly constant with respect to changes in the vibrational frequency of bridge 13 as this frequency exceeds frequency $f_1$. This bearing stiffness under dynamic conditions is identified as $K_d$.

It can be seen from FIG. 2, that, for a bearing with low static stiffness, the bearing stiffness will increase with increasing vibrational frequency until the steady state stiffness, $K_d$ is reached at which time the slope of the curve approaches zero. In FIG. 2, the slope of the curve is always positive or zero. Such low static stiffness bearings tend to have a larger air gap and a greater air supply than bearings with a high static stiffness. Also, such bearings tend to be very stable, since the slope of the curve of FIG. 2 is never negative, and all resonant frequencies are adequately damped. However, such a system is unacceptable for coordinate measuring machines, because it is subject to large static deflections and may permit misalignment of the machine structure.

In contrast, in FIG. 3, for a bearing with high static stiffness, the stiffness of the bearing decreases with increasing frequency until the steady state condition, $K_d$ is reached. It can be seen that the slope of the curve in FIG. 3 is negative over a large range of low frequencies. Bearings tend to be unstable in the area of negative slope. Thus, in the range of frequencies from zero to about $f_1$ in FIG. 3, where the slope becomes zero, the bearing tends to be unstable. Of particular concern, is the instance when a resonant frequency or several resonant frequencies of bridge 13 fall within the range of zero to $f_1$. Under these conditions, the bearing will act as an amplifier, maintaining, and possibly even increasing the vibrations in bridge 13, producing an unacceptably long settling time for the system, or no settling at all. If these vibrations are not completely damped out of the system prior to the taking of any measurements by the probe, the accuracy of this system could be adversely affected, or unacceptably long delays between measurements could result.

Figure 4:
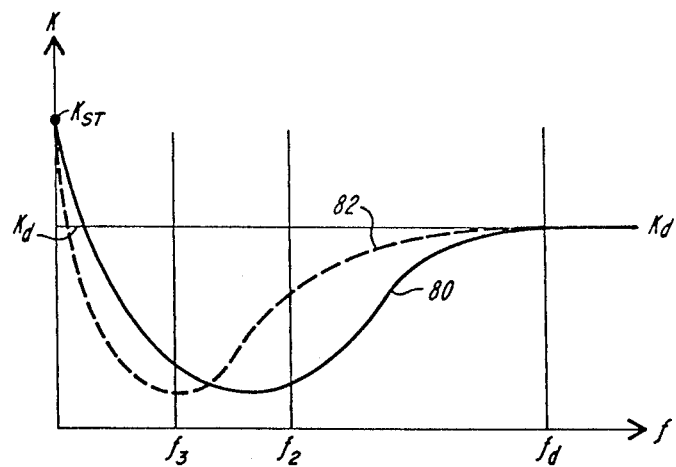
FIG. 4 is a graph showing a plot of bearing stiffness versus frequency for both a gas bearing having a primary chamber and the gas bearing of the present invention.

Modifications have been made to prior art bearing systems to deal with this problem. An air reservoir has been provided between the air supply, and the ports supplying air to the air gap. The provision of such a reservoir produces a modified curve 80 as shown in FIG. 4. FIG. 4 is again a plot of bearing stiffness versus frequency of vibration of bridge 13. Such a reservoir tends to damp certain vibrations out of the system, and causes a shift of the negative slope of the curve shown in FIG. 3 to lower frequencies as shown in FIG. 4. Thus, with such a reservoir, only at frequencies below $f_2$ as shown in FIG. 4, will the bearing be unstable. At frequencies greater than $f_2$, the slope is either positive or zero, and in this range, the bearing is stable.

This performance is acceptable for some prior art coordinate measuring machines, but it is not acceptable for all such machines, especially high speed, light weight machines. Even with a reservoir, there is still a substantial range of frequencies from zero to $f_2$ in which the bearing is unstable, and if the resonant frequency of the bridge happens to fall within that range, problems can still arise. In particular, in the coordinate measuring machine illustrated an FIG. I, the resonant or natural frequencies of bridge 13 to be about seven Hertz or greater. For most prior art bearings, the frequency $f_2$, as shown in FIG. 4, is greater than seven Hertz. As a result, even with a reservoir, there is a narrow range of frequencies within which the bearing is unstable, and within which resonant frequencies of the bridge 13 lie.

Figure 5:
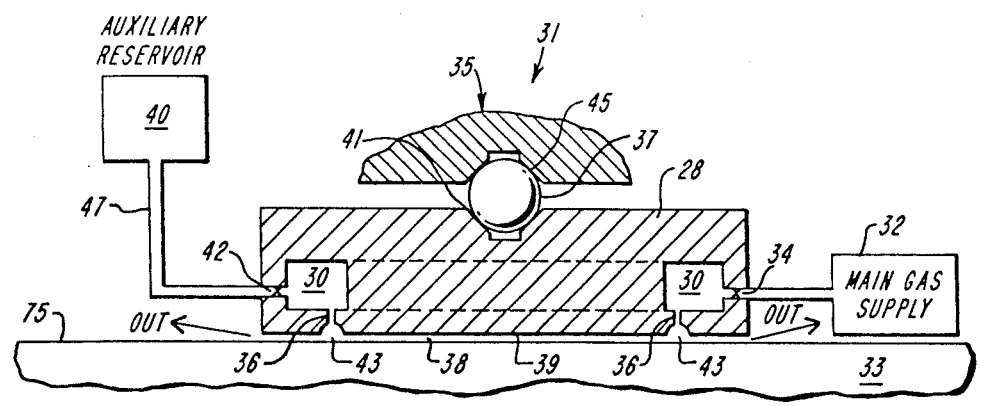
FIG. 5 is a fragmentary, diagrammatic, cross-sectional view showing the gas bearing system of this invention.

With particular reference to FIG. 5, the gas bearing system 31 of the present invention will now be described. Bearing system 31 is shown in conjunction with two members which are movable with respect to one another, a rail 33, and a member 35 which rides on bearing surface 75 of rail 33. Bearing system 31 typically is associated with and mounted onto member 35 and bearing system 31 is used in quiding member 35 in a rectilinear path on rail 33 with a high level of accuracy. Member 35 moves longitudinally of rail 33, or from left to right or from right to left as shown in FIG. 5. Rail 33 may be any one of rails 18, 20, 21 or 22, or it may be any other conventional rail used in a high precision positioning machine. Member 35 may be any one of support members 15 of bridge 16 or carriage 24, or member 35 may be any other like movable member of a high precision positioning machine, such as a support for a carriage, column or table. Rail 33 is typically formed of steel, granite, aluminum or some other solid material which provides a suitable contour. Surface 75 of rail 33 is machined to considerable accuracy, so that surface 75 is made to fall within one plane. It is desired to maintain a precise, predetermined relationship between movable member 35 and rail 33 as member 35 travels along rail 33, regardless of any imperfections that may occur in the system.

Typically, bearing system 31 is used in opposed pairs which are disposed on opposite sides of a rail. However, for purposes of discussion, only one such bearing system 31 will be described. It is understood that the opposed bearing system would be substantially identical to the bearing system shown in FIG. 5.

Bearing system 31 includes a shoe 28 and a ball 37. Shoe 28 typically is either a generally rectangular-shaped or a generally circular, disc-shaped block formed of a metal, such as aluminum with a hard coat, anodized surface, a corrosion-free steel or any other suitable material. Shoe 28 has a bearing surface 39 which is in a closely spaced, confronting, generally parallel relationship with bearing surface 75 of rail 33. Disposed within shoe 28 and extending around shoe 28 is an inner primary reservoir 30. Reservoir 30 may be formed either of a single chamber, or a plurality of interconnected, separated chambers, and reservoir 30 may have any suitable shape, such as, for example, the annular shape shown in FIG. 5. Pressurized gas is supplied to reservoir 30 of bearing shoe 28 through a primary flow restrictor 34 from a source 32 of pressurized gas. Formed on surface 39 of shoe 28 adjacent to reservoir 30 are channels 43 which are in gaseous communication with reservoir 30 through one or more narrowed ports 36. Channels 43 may be disposed in the same configuration as reservoir 30, or they may have an H-shape, an X-shape, or any other convenient shape conventionally used in such bearing systems. The gas passes along channels 43 and escapes between bearing surface 39 and surface 75 of rail 33 to provide the desired very thin cushion or film of gas in the gap between surfaces 39 and 75 which produces the nearly frictionless relationship between surface 39 and 75. Typically, the gap between surfaces 39 and 75 is of the order of 0.004 inch.

Ball 37 resides within a complementary recess 41 disposed on surface 73 of shoe 28. Recess 41 is disposed opposite of surface 39 and is centered on surface 73 of shoe 28. Ball 37 also resides in a complimentary recess 45 in member 35. In this manner, a load carried by member 35 is transferred to shoe 28 via ball 37, and ball 37 permits and accommodates some angular misalignment of member 35 with respect to shoe 28. Recess 41 should overlie a solid portion of shoe 28 and should not overlie any portion of reservoir 30, since the reservoir portion of shoe 28 may not have sufficient strength to carry the required load. For this reason, reservoir 30 typically extends along and adjacent to the outer lateral surface of shoe 28.

Disposed externally of shoe 28 is an auxiliary reservoir 40. Auxiliary reservoir 40 is in gaseous communication with reservoir 30 through conduit 47 and secondary restrictor 42. Restrictor 42 controls the flow of gas between reservoir 40 and reservoir 30. Reservoir 40 is a closed reservoir, and receives gas only through restrictor 42 and only from reservoir 30. No gas whatsoever is supplied directly to auxiliary reservoir from the main gas supply 32. Auxiliary reservoir 40 has a capacity or internal volume equal to or greater than the capacity or internal volume of reservoir 30. The resistance to flow of gas through restrictor 42 is lower than the resistance to flow of gas through restrictor 34. However, the resistance to flow of gas through restrictor 42 is higher than the resistance to flow of gas through all of ports 36. In other words, gas will move at a lower flow rate from reservoir 30 into auxiliary reservoir 40 than it will pass from reservoir 30 through ports 36, and gas will pass at a lower flow rate through restrictor 34 than through either of restrictor 42 or combined ports 36. Auxiliary reservoir 40 can be tuned by changing its volume and the resistance to flow of gas through restrictor 42 to meet specific requirements of the machine elements which are most susceptible to oscillations. In this way, reservoirs 30 and 40 together provide maximum static stiffness as well as dampening of a range of low and higher frequency vibrations.

It is preferred that auxiliary reservoir 40 not be made a part of shoe 28. Shoe 28 typically is not sufficiently large to accommodate both reservoirs 30 and 40. In addition, the same result cannot be achieved simply by making reservoir 30 somewhat larger. In the first place, there is a physical limit on the size with which reservoir 30 can be made, because of the size and structural strength requirements of shoe 28. Secondly, if reservoir 30 were merely increased in size, the response of the bearing system would be sacrificed. There must be two separate reservoirs to produce the result desired.

In a preferred embodiment, restrictors 34 and 42 are finely fabricated jewels which are inserted into an orifice to provide the desired flow restriction. Preferably, the rate of flow of restrictors 34 and 42 are fixed and can only be changed by replacing the jewel. Typically for round disk-sloped bearings 26 in a coordinate measuring machine of the type shown in FIG. 1, three ports 36 are provided. For rectangular-shaped bearings, four ports may be used. For bearings 26 in such an exemplary coordinate measuring machine, the permitted flow rate of gas through restrictor 42 is about two to two and one-half times the permitted flow rate of gas through restrictor 34. Furthermore, the permitted flow rate of gas through each of ports 36 for bearings 26 is approximately one and one-half times the permitted flow rate through restrictor 34, so that the permitted flow rate of gas through all of ports 36 is approximately four and one-half times the permitted flow rate through restrictor 34. For bearings 26 in such an exemplary coordinate measuring machine, the volume of reservoir 40 is approximately one and one-half to about two and one-half times that of reservoir 30.

The present invention produces a relationship of bearing stiffness versus frequency as shown by curve 82 of FIG. 4. Curve 82 has a positive slope, or a zero slope at all frequencies greater than $f_3$. Thus, the bearing is stable at all frequencies greater than $f_3$. The portion having a negative slope is pushed sufficiently far to he left, or into sufficiently low frequencies, that the frequencies at which the bearing is unstable lie outside the range of the resonant frequencies of bridge 13. For the particular coordinate measuring machine illustrated in FIG. 1, $f_3$ is approximately 5 hertz. Thus there is no danger that resonant frequencies of bridge 13 will occur at frequencies at which the bearing is unstable and all resonant frequencies of bridge 13 are adequately damped by bearing system 31.

At higher frequencies, bearing system 31 performs much as the prior art reservoir containing bearing system operates, and such higher frequency vibrations are adequately damped solely by the flow of air from reservoir 30 through ports 36. Little or no air flows to or from reservoir 40 and reservoir 40 plays no part in the damping of such vibrations. Furthermore, since no air flows to or from reservoir 40, the high static stiffness of bearing system 31 is maintained in accordance with the requirements of most coordinate measuring machines. However, at lower frequencies, air is drawn from reservoir 40 into reservoir 30, and is expelled from reservoir 30 back into reservoir 40. At these lower frequencies, ports 36 "see" a larger volume, and bearing system 31 acts as a softer bearing system. As a result, these lower frequency vibrations are now adequately damped. Thus, bearing system 31 provides the high static stiffness required, along with the desired dampening of high frequency vibrations as in the prior art, and in addition, provides dampening of lower frequency vibrations to provide the desired shift in the bearing stiffness versus frequency of vibration curve into lower frequencies.

In operation, the bearing system 31 of the present invention functions as follows. Since the bearing system is required to have a high static stiffness, the gas flow through primary restrictor 34 is relatively low, and the gap or space between bearing surface 39 and bearing surface 75 is very small. In such stiff bearings, in a plot of the force or resistance to movement of the bearing shoe 28 normal to surface 39 versus changes in the gap between bearing surfaces 39 and 75, the slope is very steep. Thus, very small changes in that gap between surfaces 39 and 75 create large resistive forces. If there are no vibrations in the system, as the bearing is loaded under static conditions, it will experience a very small deformation of the air gap between surfaces 39 and 75. Depending upon the stiffness of the bearing, this gap will be restored to its original size very quickly by the continued supply of gas from source 32 and because of the strong resistive forces that result from very small changes in this gap at zero vibration. If there are present in bridge 13, in a region below frequency $f_3$ or an other parts of the coordinate measuring machine system, as seen from FIG. 4, the stiffness of the bearing, in its reaction changes in the size of the air gap between surfaces 39 and 75 due to these vibrations decreases rapidly with increasing frequency of vibration, and vibrations are less readily damped. If a resonant frequency of the bridge system happens to coincide with this negative portion of the slope, the bearing system 31 could act as an amplifier and actually reinforce and increase the vibrations in the system.

At very high frequencies of vibration for bridge 13, regardless of whether the bearing has low or high static stiffness, vibrations are quickly damped without the assistance of reservoirs 30 or 40. At these high frequencies, surface 39 is moving toward and away from surface 75 at such a high speed, that the gas contained therebetween does not have an opportunity to escape between oscillations, and is alternatively compressed and expanded. As a result, there is very little change in the size of the gap between surfaces 39 and 75 caused by vibrations and the resistive forces are not significantly altered.

In contrast, at somewhat lower frequencies, such as those found on the portion of curve 82 between $f_2$ and $f_d$, the frequency is sufficiently lower, that the gas has an opportunity to escape from between surfaces 39 and 75 between oscillations. In the absence of reservoirs 30 and 40, the gap between surfaces 39 and 75 would tend to rapidly lose gas due to a limited supply of gas through restrictor 34. Because of the significantly reduced resistive force, surfaces 39 and 75 would tend to quickly collapse toward one another producing a smaller gap and thus a much stronger resistive force. The surfaces 39 and 75 would then be driven apart, causing the cycle to repeat itself. The vibrations would continue until damped, much like a spring or they would sustain themselves as continuous oscillations. In such lower frequency situations, the provision of reservoir 30 quickly damps these vibrations by making the gas supply appear to be unlimited. During periods in which the gap between surfaces 39 and 75 is narrowed and gas has escaped therefrom, gas from reservoir 30 tends to flow into the gap because of the lower gas pressure therein, replacing the gas that had escaped therefrom. This inflow of gas from reservoir 30 prevents surfaces 39 and 75 from becoming too close, and as a result, the resistive forces developed are diminished. Thus, the resistive forces are maintained at nearer their desired equilibrium level. As a result, these vibrations are quickly damped out of the system. Under these conditions, gas must be pumped by reservoir 30 into the gap between surfaces 39 and 75 only for very short intervals, and reservoir 30 has a sufficient capacity to do so, since it is adequately replenished by the gas supply.

However, at frequencies between $f_2$ and $f_3$, as shown in FIG. 4, because the period of vibration is so long, a considerably larger amount of air is permitted to escape from the gap between surfaces 39 and 75. The volume of air that escapes is too large to be adequately replenished from reservoir 30 alone, and reservoir 30 no longer acts as an unlimited air supply. As a consequence, the vibrations are not adequately damped. If reservoir 30 were enlarged to permit damping of these lower frequency vibrations, there would be a greater permitted gas flow through ports 36, producing a very soft bearing in this frequency region. Such a soft bearing would provide a poor response to accelerations imposed onto the machine by X-axis drive 29 causing sudden complete collapse of the bearing and therefore damage to the rail. This situation would be intolerable for coordinate measuring machines.

The use of reservoir 40 produces a result different from merely enlarging reservoir 30. At frequencies higher than $f_2$, there is little or no air flow through restrictor 42 to and from reservoir 40. This is because the period of the oscillation is short for gas flowing to and from reservoir 30 through ports 36 and because the resistance to flow of restrictor 42 is substantially greater than the resistance to flow of gas through ports 36. However, at frequencies between $f_2$ and $f_3$, as shown in FIG. 4, because the period during which gas is expelled from reservoir 30 is sufficiently long, and because the volume of gas expelled is sufficiently great and because the resistance to flow of gas through restrictor 42 is not too great, air is drawn out of reservoir 40 through restrictor 42 and into reservoir 30. Thus, at these lower frequencies, auxiliary reservoir 40 supplies gas to reservoir 30 with sufficient internal damping between reservoirs 30 and 40 in response to the demands of the bearing system. Therefore, at these frequencies, the greater combined capacity of reservoirs 30 and 40 acts as an unlimited gas supply to replenish the gas that escapes from between surfaces 39 and 75 to produce the desired damping of the vibrations. Since the resistance to flow through restrictor 42 and ports 36 less than the resistance to flow through restrictor 34, at no time is additional air drawn from gas supply 32 in response to these vibrations. Air drawn only from reservoir 40.

At high frequencies, gas bearing system 31 thus has an apparent small volume reservoir, while at low frequencies, gas bearing system 31 has an apparent large volume reservoir with sufficient internal damping. Vibrations are therefore damped at both high and low frequencies. Under static conditions, no air is drawn from reservoir 40, and the requisite high static stiffness also is maintained.

Having described one preferred embodiment of the present invention, it should be obvious to those skilled in the art that various modifications and alterations are possible without departing from the scope of the invention. Such obvious modifications and alterations are intended to be included within the scope of the invention which is not to be limited by the above discussion of a single preferred embodiment. The only limitations upon the scope of the invention are defined by the appended claims and their equivalents.

What is claimed is:

1. A gas bearing system for guiding movement of one member relative to another member, said system comprising:
   a first member having a bearing surface disposed thereon;
   a bearing shoe associated with a second member and having a bearing surface disposed thereon in spaced, confronting relation with said bearing surface of said first member, said first member bearing surface and said bearing shoe bearing surface being movable relative to one another;
   means for supplying pressurized gas to said bearing shoe;
   an enclosed first reservoir disposed in gaseous communication with said supplying means;
   a second reservoir disposed in gaseous communication only with said first reservoir;
   at least one port for restricting a flow of gas from said first reservoir to a space between said bearing surface of said shoe and said bearing surface of said first member;
   first means for restricting a flow of gas to said first reservoir from said supplying means; and
   second means for restricting a flow of gas between said first reservoir and said second reservoir.

2. A gas bearing system as recited in claim 1 wherein said first flow restricting means provides a resistance to flow of gas therethrough greater than a resistance to flow of gas through either of said second flow restricting means and said port.

3. A gas bearing system as recited in claim 1 wherein said second reservoir has an internal volume no less than an internal volume of said first reservoir.

4. A gas bearing system as recited in claim 3 wherein said second reservoir has an internal volume which is approximately 2.5 times the internal volume of said first reservoir.

5. A gas bearing system as recited in claim 1 wherein said second reservoir is disposed outside of said bearing shoe.

6. A gas bearing system as recited in claim 1 wherein said first reservoir is disposed within said bearing shoe.

7. A gas bearing system as recited in claim 1 wherein said first reservoir is an annular-shaped chamber.

8. A gas bearing system as recited in claim 1 wherein resistance to flow of gas through said second flow resisting means is less than resistance to flow of gas through said first flow resisting means, and greater than resistance to flow of gas through said port.

9. A gas bearing system as recited in claim 1 wherein said second flow restricting means provides a resistance to flow of gas therethrough greater than a resistance to flow of gas through said port.

10. A gas bearing system as recited in claim 1 wherein said first reservoir is disposed within said bearing shoe and is surrounded by portions of said shoe.

11. A gas bearing system for guiding movement of one member relative to another member, said system comprising:
    a first member having a bearing surface disposed thereon;
    a bearing shoe associated with a second member and having a bearing surface disposed thereon in spaced, confronting relation with said bearing surface of said first member, said first member bearing surface and said bearing shoe bearing surface being movable relative to one another;
    means for supplying pressurized gas to said bearing shoe;
    an enclosed first reservoir disposed in gaseous communication with said supplying means;
    at least one port for restricting a flow of gas from said first reservoir to a space between said bearing shoe bearing surface and said bearing surface of said first member;
    a second reservoir disposed in gaseous communication only with said first reservoir; and
    restrictor means for permitting a flow of gas between said first reservoir and said second reservoir only within a predetermined range of frequencies of vibration of said second member and for preventing a flow of gas between said first reservoir and said second reservoir at frequencies of vibration of said second member other than said predetermined range of frequencies.

12. A coordinate measuring machine comprising:
    a base;
    a table disposed on said base for supporting a part to be measured;
    a pair of spaced, parallel X-rails mounted on said base;
    two support members, each support member being slideable along one of said two X-rails;
    a Y-rail aligned in a direction generally orthogonal to said X-rails and extending between said support members;
    a carriage slideable along said Y-rail;
    a Z-rail mounted on said carriage in slideable relation therewith in a direction generally normal to said Y-rail and said X-rail;
    means associated with one of said X-rails for driving said support members and said Y-rail along said X-rails; and gas bearing system for guiding movement of each of said support members along its associated X-rail, said gas bearing system comprising:
- a bearing surface disposed on an associated X-rail;
- a bearing shoe associated with said support member and having a bearing surface disposed thereon in spaced, confronting relation with said bearing surface of said associated X-rail;
- means for supplying pressurized gas to said bearing shoe;
- an enclosed first reservoir disposed in gaseous communication with said supplying means;
- a second reservoir disposed in gaseous communication only with said first reservoir;
- at least one port for restricting a flow of gas from said first reservoir to a space between said bearing surface of said shoe and said bearing surface of said X-rail;
- first means for restricting a flow of gas to said first reservoir from said supplying means; and
- second means for restricting a flow of gas between said first reservoir and said second reservoir.

13. A gas bearing system as recited in claim 11 wherein said first flow restricting means provides a resistance to flow of gas therethrough greater than a resistance to flow of gas through either of said second flow restricting means and said port, and wherein said second flow restricting means provides a resistance to flow of gas therethrough greater than a flow of gas through said port.

14. A gas bearing system for guiding movement of one member relative to another member, said system comprising:
- a first member having a bearing surface disposed thereon;
- a bearing shoe associated with a second member and having a bearing surface disposed thereon in spaced, confronting relation with said bearing surface of said first member, said first member bearing surface and said bearing shoe bearing surface being movable relative to one another;
- means for supplying pressurized gas to said bearing shoe;
- a first reservoir disposed in gaseous communication with said supplying means;
- a second rservoir disposed in gaseous communication only with said first reservoir, said second reservoir having an internal volume which is approximately 2.5 times the internal volume of said first reservoir;
- at least one port for supplying gas from said first reservoir to a space between said bearing surface of said shoe and said bearing surface of said first member;
- first means for restricting a flow of gas to said first reservoir from said supplying means; and
- second means for restricting a flow of gas between said first reservoir and said second reservoir.

15. A gas bearing system for guiding movement of one member relative to another member, said system comprising:
- a first member having a bearing surface disposed thereon;
- a bearing shoe associated with a second member and having a bearing surface disposed thereon in spaced, confronting relation with said bearing surface of said first member, said first member bearing surface and said bearing shoe bearing surface being movable relative to one another;
- means for supplying pressurized gas to said bearing shoe;
- a first reservoir disposed in gaseous communication with said supplying means;
- a second reservoir disposed in gaseous communication only with said first reservoir, said second reservoir being disposed outside of said bearing shoe;
- at least one port for supplying gas from said first reservoir to a space between said bearing surface of said shoe and said bearing surface of said first member;
- first means for restricting a flow of gas to said first reservoir from said supplying means; and
- second means for restricting a flow of gas between said first reservoir and said second reservoir.

* * * * *